C. EATON.
FOOD SAFE.
APPLICATION FILED MAY 2, 1921.
1,411,272.
Patented Apr. 4, 1922.
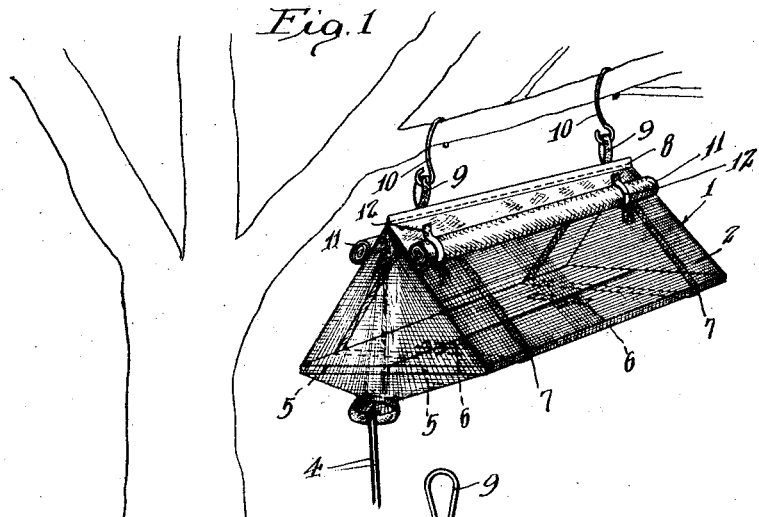
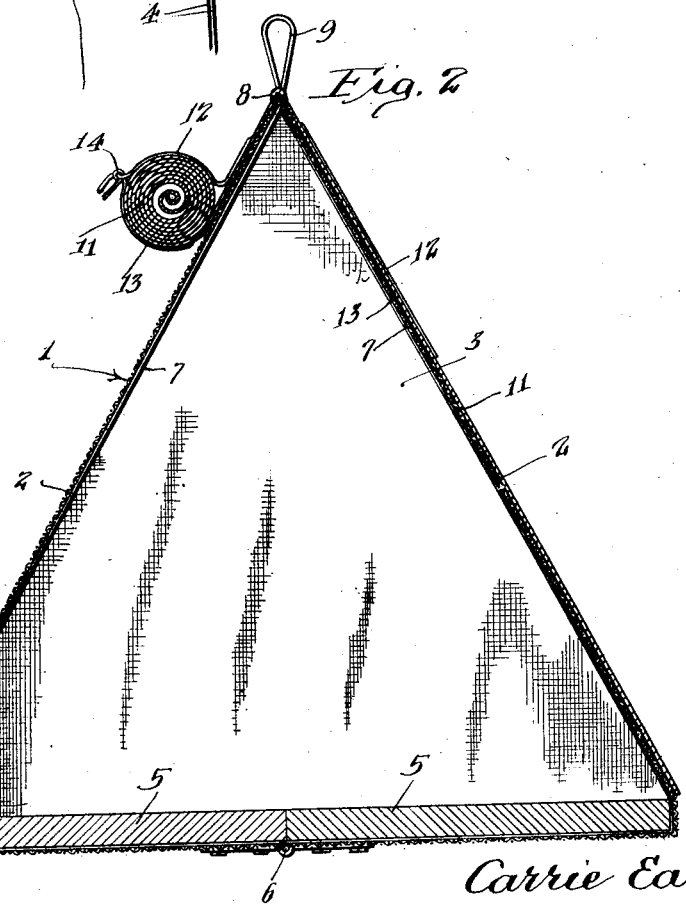
Inventor
Carrie Eaton
By Frederick W. Hyou
Attorney

UNITED STATES PATENT OFFICE.

CARRIE EATON, OF RIVERA, CALIFORNIA.

FOOD SAFE.

1,411,272.  Specification of Letters Patent.  Patented Apr. 4, 1922.

Application filed May 2, 1921. Serial No. 466,307.

*To all whom it may concern:*

Be it known that I, CARRIE EATON, a subject of the King of Great Britain, and a resident of Rivera, in the county of Los Angeles and State of California, have invented certain new and useful Improvements in Food Safes, of which the following is a specification.

This invention relates to devices of the character employed for storing food, and more especially to a food safe provided with pervious walls through which the air can readily pass to cool and prevent spoiling of the food.

An object of the invention is to provide a food chest of the character mentioned above, and more especially one that is particularly useful for campers.

Another object is to prevent flies from settling on food exposed to the air.

Another object is to provide a device of this kind which can be readily suspended from a tree or other suitable support so as to make it practically inaccessible to animals and non-flying insects.

Another object is to so construct the food safe that the contents thereof may be left fully exposed to the air when the weather conditions are good and may be protected against snow and rain when necessary.

Another object is to construct the safe so that the different parts thereof may be very readily cleansed.

The accompanying drawings illustrate the invention:

Figure 1 is a perspective view of a food chest constructed in accordance with this invention and suspended from the limb of a tree, which is fragmentarily indicated, the curtains being rolled up in open position.

Figure 2 is an enlarged transverse sectional elevation of the food chest shown in Figure 1, one of the curtains being shown in closed position and the other in open position.

There is provided a sack 1 formed at least in part of more or less pervious material. In the instance shown in the drawings, the sack 1 is of triangular cross section and is constructed of loosely woven cloth 2 and more closely woven cloth 3, the former forming the sloping side walls and the latter forming one triangular end wall of the sack. It is obvious that the sack thus constructed may be readily laundered, when desired. The end of the sack opposite to the end wall 3 is not permanently closed but is provided with means to contact the mouth of the sack, such means in this instance being in the form of a draw-string 4 of well known construction. Loosely mounted inside of the sack 1 and supported by the sack walls is a floor comprising hingedly connected sections 5 which extend longitudinally of the sack, the hinges being indicated at 6 and being positioned on the under face of the floor so that when the floor is in the unfolded position shown in the drawings the adjacent edges of the sections will abut one another and thus prevent downward collapsing of the floor. The floor could be made in one piece, but it is preferable to make it in sections so that it may be folded into a small compass for storing when the safe is not in use. Thus the walls of the sack enclose the space above the floor.

Extending around the sack 1 and stitched or otherwise fastened thereto are bands 7 which form, adjacent the apex 8 of the sack, eyes 9 which are utilized for suspending the safe from any suitable support. In Figure 1, hooks 10 are shown engaging the eyes 9 and hooked over the limb of a tree. A rope, wire or any other suitable means may be employed in lieu of the hooks 10 for suspending the safe.

Fastened along the apex 8 of the sack 1 is a suitable cover comprising side curtains 11, one for each of the sloping side walls of the sack. In Figure 1 these curtains are both shown in open position, and in Figure 2 one of the curtains is shown closed and the other open. Any suitable means may be employed for holding the curtains in open position and, in this instance, such means comprise pairs of co-operating tapes 12, 13 fastened, respectively, to opposite faces of each curtain and adapted to be tied at their free ends around the curtains, as indicated at 14, when the curtains are folded or rolled up.

The bands 7 are not absolutely necessary, but they are of advantage as an aid in supporting the floor when said floor is heavily loaded with articles of food. Thus the bands add to the strength of the sack for supporting the food. When it is desired to use the device it will be suspended somewhat in the manner shown in Figure 1 of the drawings and the food will be inserted through the open end of the sack and placed upon the floor, and then the draw-string 4 will be pulled to close the sack so that flies and other insects cannot have access to the interior. One of the great advantages of the invention is that the food of campers may thus be kept away from flies and other winged insects which, as is well known, are generally so numerous around camp sites.

Ordinarily the curtains 11 will be maintained in the open position as shown in Figure 1, but should rain or snow come the curtains will be lowered so as to protect the food within the sack. It is obvious that when it is desired to transport the safe, it is only necessary to collapse the floor and fold the sack therearound, and the safe may then be slipped into a suitable case, not shown, made of cloth or other suitable material. It is not necessary to provide a case for the safe, but such case would prevent the safe from becoming soiled when not in use.

When it is desired to launder the sack, the floor may be withdrawn through the mouth thereof, and when this is done the floor itself may be readily cleansed.

From the foregoing, it is clear that the construction described above produces a sanitary food receptacle, especially useful for campers, and that the pervious construction of the sack allows the air to pass through the sack and around the food supported by the floor.

I claim:

1. In a food safe the combination of a sack formed of pervious material, curtains to engage the outside walls of the sack, a floor in the sack, and means to support the sack from an outside object.

2. In a food safe, the combination of a sack formed of pervious material, curtains to engage the outside walls of the sack, a floor in the sack comprising hinged sections, and means to support the sack from an outside object.

Signed at Los Angeles, California, this 23d day of April, 1921.

CARRIE EATON.

Witnesses:
GEORGE H. HILES,
L. BELLE WEAVER.